United States Patent
Kim et al.

(10) Patent No.: US 12,028,722 B2
(45) Date of Patent: Jul. 2, 2024

(54) METHOD AND APPARATUS FOR DIGITAL TWIN-BASED BEAMFORMING

(71) Applicant: Korea University of Technology and Education Industry-University Cooperation Foundation, Cheonan-si (KR)

(72) Inventors: Won Tae Kim, Cheonan-si (KR); Han Jin Kim, Cheongju-si (KR); Jun Hyung Kwon, Boryeong-si (KR)

(73) Assignee: KOREA UNIVERSITY OF TECHNOLOGY AND EDUCATION INDUSTRY-UNIVERSITY COOPERATION FOUNDATION, Cheonan-si (KR)

(*) Notice: Subject to any disclaimer, the term of this patent is extended or adjusted under 35 U.S.C. 154(b) by 50 days.

(21) Appl. No.: 18/077,215

(22) Filed: Dec. 7, 2022

(65) Prior Publication Data
US 2024/0073702 A1    Feb. 29, 2024

(30) Foreign Application Priority Data
Aug. 23, 2022 (KR) ........................ 10-2022-0105616

(51) Int. Cl.
- H04B 7/02 (2018.01)
- H04B 7/0456 (2017.01)
- H04W 16/28 (2009.01)

(52) U.S. Cl.
CPC .......... *H04W 16/28* (2013.01); *H04B 7/0456* (2013.01)

(58) Field of Classification Search
CPC .... H04W 16/28; H04W 16/18; H04B 7/0456; H04B 7/0617; H04B 7/0695

USPC .......................................................... 375/267
See application file for complete search history.

(56) References Cited

U.S. PATENT DOCUMENTS

| | | | |
|---|---|---|---|
| 11,050,474 B2* | 6/2021 | Subramanian | H04W 72/21 |
| 2019/0109625 A1* | 4/2019 | Subramanian | H04B 7/063 |
| 2019/0173109 A1* | 6/2019 | Wang | H01M 8/04089 |
| 2020/0044709 A1* | 2/2020 | Kang | H04W 56/0015 |
| 2020/0285464 A1* | 9/2020 | Brebner | G06F 11/362 |
| 2021/0314039 A1* | 10/2021 | Khalid | H04W 64/003 |

FOREIGN PATENT DOCUMENTS

JP    2021158397 A    10/2021

* cited by examiner

*Primary Examiner* — Helene E Tayong
(74) *Attorney, Agent, or Firm* — STIP Law Group, LLC

(57) ABSTRACT

An operating method of a server operating a digital twin built into a virtual space for a plurality of base stations and a plurality of mobile devices may be provided.

The operating method according to an embodiment of the present disclosure may include: invoking a digital twin-based beamforming management service; obtaining location information about a target mobile device from among the plurality of mobile devices and a target base station corresponding to the target mobile device; searching for a plurality of paths capable of forming a beam from the target base station to the target mobile device based on the location information and spatial information of the digital twin; performing a first communication performance simulation for the plurality of paths; determining a final beamforming parameter based on a result of the first communication performance simulation; and transmitting beamforming information including the final beamforming parameter to the target base station.

9 Claims, 6 Drawing Sheets

METHOD AND APPARATUS FOR DIGITAL TWIN-BASED BEAMFORMING

CROSS-REFERENCE TO RELATED APPLICATIONS

This application claims the priority of the Korean Patent Applications NO 10-2022-0105616 filed on Aug. 23, 2022, in the Korean Intellectual Property Office, the disclosure of which is incorporated herein by reference.

BACKGROUND

1. Field

The present disclosure relates to a method and an apparatus for digital twin-based beamforming for a large-scale mobile system.

2. Description of the Related Art

Beamforming technology is widely used in defense and civil fields such as radar, sonar, and medical imaging. In particular, in the field of mobile communication, since the beamforming technology was introduced in the LTE standard, in the current 5G mobile communication system, the beamforming technology has become a major technology to realize a beamforming gain of high-capacity data processing and millimeter-wave band communication based on a massive multiple-input multiple-output (MIMO) antenna.

In a mobile communication system, the beamforming technology is used to focus a signal in a specific area without uniformly forming a signal within a communication reach. That is, the beamforming technology may be utilized to provide a high transmission capacity to a specific user, and is used as a technology to increase the frequency efficiency that can distinguish multiple users using the same radio resource through spatial beamforming.

The background described above is possessed or acquired by the inventor in the process of deriving the present disclosure, and is not necessarily known art published to the public prior to the filing of the present disclosure.

DESCRIPTION OF EMBODIMENTS

Technical Solution

As an embodiment of the present disclosure, an operating method of a server operating a digital twin built into a virtual space for a plurality of base stations and a plurality of mobile devices may be provided.

The operating method according to an embodiment of the present disclosure may include: invoking a digital twin-based beamforming management service; obtaining location information about a target mobile device from among the plurality of mobile devices and a target base station corresponding to the target mobile device; searching for a plurality of paths capable of forming a beam from the target base station to the target mobile device based on the location information and spatial information of the digital twin; performing a first communication performance simulation for the plurality of paths; determining a final beamforming parameter based on a result of the first communication performance simulation; and transmitting beamforming information including the final beamforming parameter to the target base station.

The determining of the final beamforming parameter according to an embodiment of the present disclosure may include: determining an optimal path from among the plurality of paths based on the result of the first communication performance simulation; and calculating a final beamforming parameter for forming the beam with the optimal path.

The determining of the final beamforming parameter according to an embodiment of the present disclosure may include: determining an angle of departure based on the result of the first communication performance simulation; and calculating a delay time and a phase for each element of an antenna array for forming the beam at the angle of departure.

The operating method according to an embodiment of the present disclosure may further include: predicting a moving path of the target mobile device; performing a second communication performance simulation on the predicted moving path; and detecting communication performance degradation of the target mobile device based on a result of the second communication performance simulation.

The invoking of the digital twin-based beamforming management service according to an embodiment of the present disclosure may include: invoking the digital twin-based beamforming management service in response to the communication performance degradation detected based on the result of the second communication performance simulation.

The invoking of the digital twin-based beamforming management service according to an embodiment of the present disclosure may include: invoking the digital twin-based beamforming management service in response to communication performance degradation information received from the target base station.

The beamforming information according to an embodiment of the present disclosure may further include information about a transmission time corresponding to the final beamforming parameter.

The operating method according to an embodiment of the present disclosure may further include: controlling, by the target base station, an antenna array based on the beamforming information received from the server without performing beam training.

DETAILED DESCRIPTION

Hereinafter, embodiments of the present invention will be described with reference to the drawings. In the following description, descriptions of a well-known technical configuration in relation to a lead implantation system for a deep brain stimulator will be omitted. For example, descriptions of the configuration/structure/method of a device or system commonly used in deep brain stimulation, such as the structure of an implantable pulse generator, a connection structure/method of the implantable pulse generator and a lead, and a process for transmitting and receiving electrical signals measured through the lead with an external device, will be omitted. Even if these descriptions are omitted, one of ordinary skill in the art will be able to easily understand the characteristic configuration of the present invention through the following description.

Figure 1A:
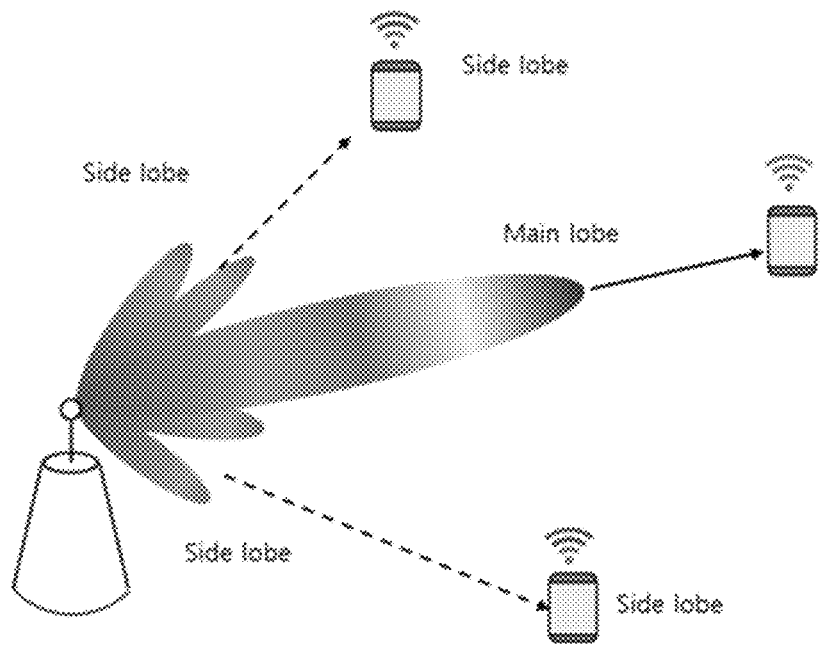
FIG. 1A is a view for explaining beamforming technology.

FIG. 1A is a view for explaining beamforming technology.

Beamforming is a technology for improving radio communication quality in wireless and mobile communication. Beamforming may be implemented using an antenna array device configured with a plurality of antenna elements. Beamforming may cause signal amplification in a specific direction and signal attenuation in another direction by finely controlling a transmission delay time of a transmitted signal and a phase of the signal. When beamforming is used, a signal is focused in a specific direction to improve a communication range and signal strength while reducing the same in another direction, thereby suppressing interference to other networks. By using beamforming, the quality of a received signal may be improved and the spatial efficiency of a frequency resource may be improved.

Referring to FIG. 1A, in a main lobe, a signal is amplified so that high-quality communication is possible, and in a side lobe, signal strength is weak, so the effect on other mobile devices is reduced. In a large-scale mobile system in which multiple mobile devices coexist, beamforming may be applied to suppress mutual interference and improve communication performance in mobile devices. Major mobile and radio communication technologies such as 5G, 4G, and Wi-Fi may use beamforming to provide communication services to many mobile users.

Beamforming may be divided into conventional beamforming and adaptive beamforming depending on whether a formation direction of the main lobe is modified. Traditional beamforming is simple to implement by focusing signals in a certain direction, and may be effective when a large number of receivers stay in a certain location for a long time. With the recent development of robotics and the use of drones, the number of mobile devices having mobility has increased compared to the past, and it has become difficult to maintain communication quality unless a beamforming direction is corrected according to movement of a mobile device.

In the adaptive beamforming, when a change in a channel state such as physical movement of a receiver and a decrease in communication quality are detected, an appropriate beam transmission direction may be searched to adapt to the changed channel environment and improve communication quality.

Figure 1B:
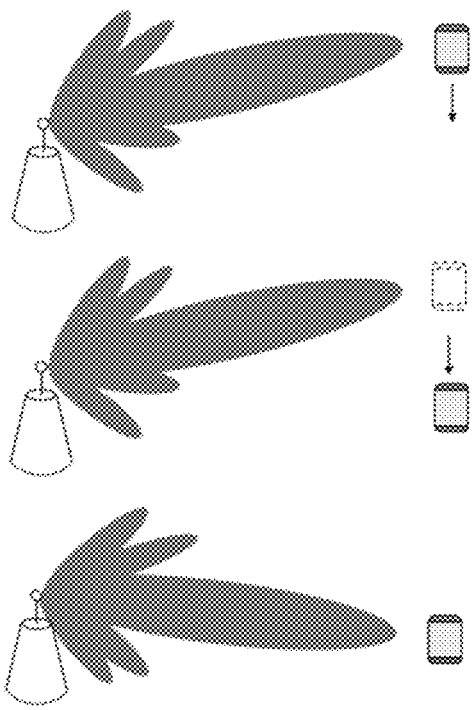
FIG. 1B is a view for explaining adaptive beamforming.

FIG. 1B is a view for explaining adaptive beamforming.

Referring to FIG. 1B, before a mobile device moves, the mobile device may be located in a main lobe formed by a base station. When a physical location of the mobile device changes and moves out of the range of the main lobe, the base station and the mobile device may detect a decrease in communication quality. Upon detecting that a communication signal is degraded, the base station and the mobile device may adapt to a new radio channel condition and modify a beam to suit the new location and radio channel condition. A main lobe of a new beam is formed at the location of the mobile device, so that the base station and the mobile device may maintain good communication quality.

The base station and the mobile device may perform channel sounding for collecting current channel state information to respond to radio channel state changes. The base station and the mobile device may exchange a null data packet (NDP), which is a packet without a data payload. The base station and the mobile device may estimate channel state information by analyzing a radio channel response to the NDP, and may form a new beam based on the estimated channel state information. A series of processes for collecting and estimating channel state information through packet exchange may be referred to as beam training.

As the mobile device moves physically, a signal propagation path between the base station and the mobile device may be blocked by an obstacle or may be interfered with by entering a communication range of another network. As mobile devices constituting a network move physically, a mobile channel has greater variability than a general radio channel and may be greatly affected by interference from physical obstacles and other signals. The great variability of the mobile channel may lead to frequent beam training. When packet switching is used in a beam training process, a data payload may not be transmitted because the radio channel is occupied by an NDP and control messages. In a large-scale mobile system in which a large number of mobile devices exist, beam training may be frequently performed to generate a large overhead.

In the conventional beamforming method, it may be difficult to solve an overhead problem occurring in a large-scale mobile system. The frequency of performing beam training increases in proportion to the variability of a mobile channel. Factors affecting the variability of a mobile channel are complex, such as physical movement, interaction with the physical environment, interference with other networks, and noise of a mobile device, and it may be impossible to perform beamforming considering these complex factors in an existing communication system. In a situation where large-scale mobile systems such as smart factories, automatic logistics systems, and public places where a large number of unmanned mobile devices, AGVs, and smart carts are used are increasing, improving a data payload rate of a mobile channel is expected to be an important challenge. In order to efficiently use beamforming in a large-scale mobile system, it is necessary to solve the problem of excessive overhead of conventional beam training.

As will be described in detail below, a digital twin-based beamforming method according to an embodiment may use a mobile system and a digital twin that reflects physical spatial characteristics to search for an optimal beam parameter through beam search, channel modeling, and communication performance verification in a virtual space, and may use beam parameters derived from the virtual space in a real mobile system to perform adaptive beamforming without beam training through packet exchange.

A digital twin according to an embodiment may be a virtual information structure that is closely connected to a physical system and reproduces the physical system in a virtual space. A digital twin existing in a virtual space mimics the characteristics of a physical system in the real world connected to the digital twin, and may perform the function of verifying the performance of the physical system in the virtual space. In addition, because the digital twin is a digital representation of the physical system, interworking between different physical systems is easy.

In order to search for an appropriate beam parameter in a virtual space, complex information such as location and network configuration information of a mobile device, location and material information of a physical obstacle, etc. is required. In the past, collecting and processing data from different physical systems was unrealistic and exhausting, but recently, digital transformation and digital twin construction are being carried out in various fields, and studies on interworking between heterogeneous physical systems are underway.

Figure 2:
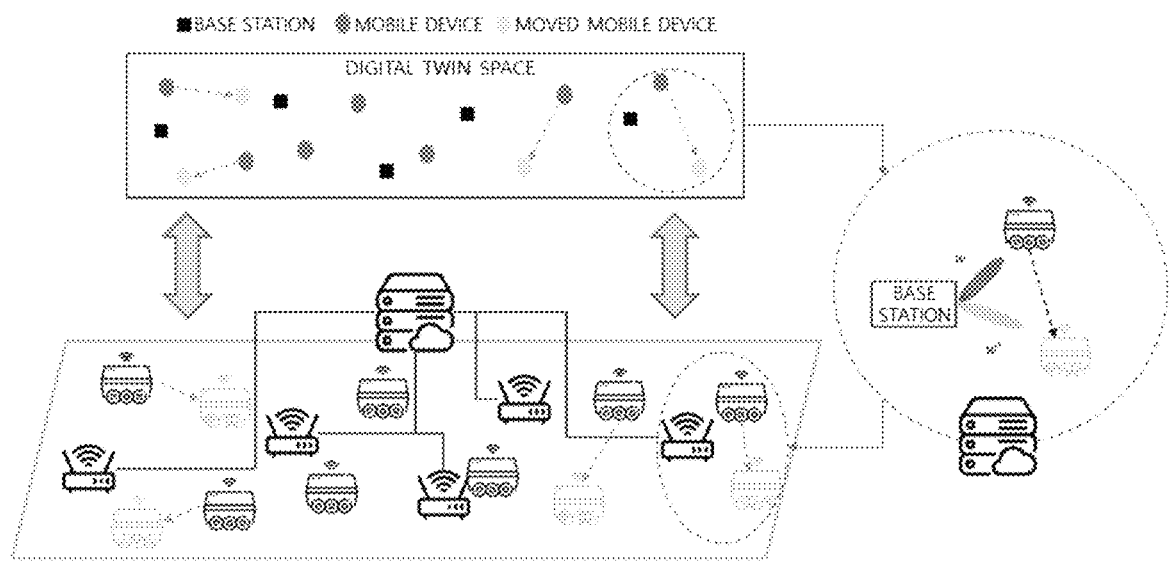
FIG. 2 is a view for explaining a digital twin-based beamforming system according to an embodiment.

FIG. 2 is a view for explaining a digital twin-based beamforming system according to an embodiment.

A base station according to an embodiment provides a network for connecting mobile devices, and is connected to a central server. A server according to an embodiment is a place where a digital twin linked with a mobile device and a base station is built and executed, and a service required to implement digital twin-based beamforming may be operated in the server. The base station according to an embodiment may transmit information about a mobile device connected to a wireless network state to the server. The digital twin of the base station managed by the server may be updated through data transmitted by the base station according to an embodiment to the server.

In an embodiment, the server may represent a server that controls a plurality of base stations so that the plurality of base stations may cooperate with each other and provides a specific service, and the base station may represent a small base station (SBS) such as an access point (AP) or a repeater as a radio communication base station.

A mobile device according to an embodiment may mean at least one user terminal included in an area covered by a base station (e.g., a cell), and may represent user equipment, a communication terminal, a user device, a station STA, or a terminal. For example, the mobile device is an electronic device that requests a file corresponding to a specific service (e.g., video streaming service, etc.), and may represent an electronic device such as a smart phone, a tablet, a laptop computer, an automated guided vehicle (AGV), a mobile robot, or a personal computer (PC).

The mobile device according to an embodiment may be connected to the digital twin of the mobile device built on the server via the base station. When a new beam parameter is needed, the server may use the digital twin to discover a new beam parameter using simulation tools, etc., and deliver an optimal beam parameter to the base station. The base station according to an embodiment may perform adaptive beamforming upon receiving the beam parameter from the server.

A line connecting the base station to the server may be Ethernet, but is not limited thereto. A wireless network connecting the base station to the mobile device may include, but is not limited to, Wi-Fi, a cellular network, and the like. The base station needs to be equipped with an antenna array as a signal transmission device, and both a single antenna and a multi-antenna may be applied to an antenna mounted on the mobile device.

A tool for searching for an optimal beam and verifying the performance of the beam according to an embodiment is included in a network simulator function, and a simulation such as ray tracing may be used, but the disclosure is not limited thereto. Standard radio channel modeling, ray tracing, etc. may be used as tools for generating and evaluating radio channel models using the digital twin according to an embodiment, but the disclosure is not limited thereto.

Figure 3:
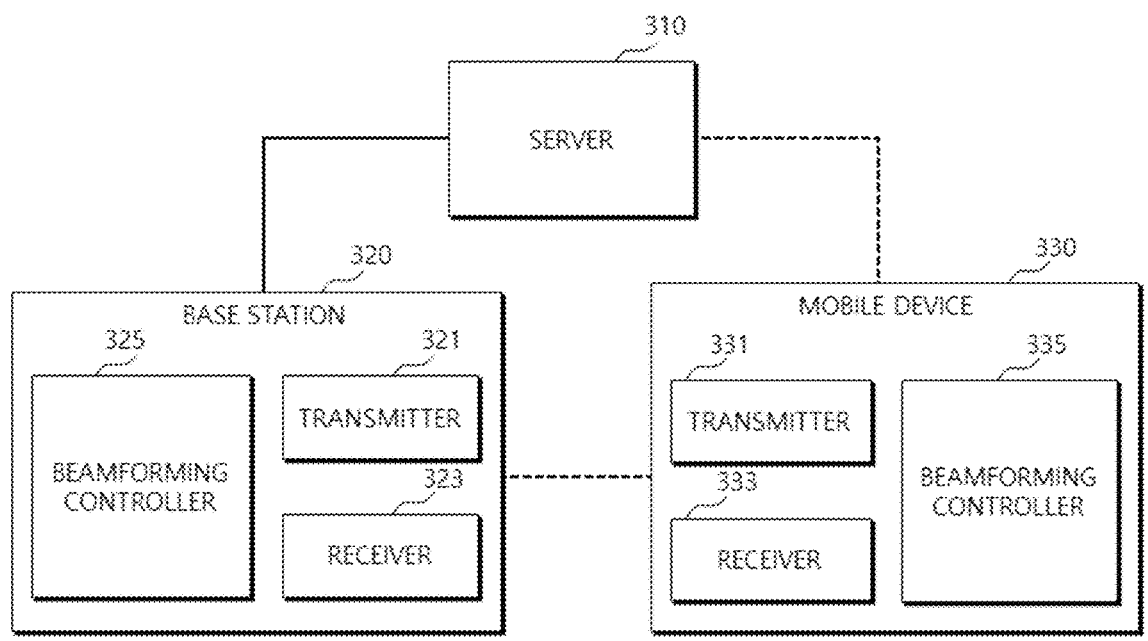
FIG. 3 is a configuration diagram of a hardware device constituting a digital twin-based beamforming system according to an embodiment.

FIG. 3 is a configuration diagram of a hardware device constituting a digital twin-based beamforming system according to an embodiment.

The contents described with reference to FIG. 2 may be equally applied to FIG. 3, and overlapping contents may be omitted.

Referring to FIG. 3, a digital twin-based beamforming system according to an embodiment may include a server 310, at least one base station 320, and at least one mobile device 330 as subjects.

The server 310 according to an embodiment may be a device that operates a digital twin and searches for an optimal beam parameter through a simulation or the like. An operating method of the server 310 according to an embodiment will be described in detail below with reference to FIGS. 4 to 5.

The base station 320 according to an embodiment may include a transmitter 321, a receiver 323, and a beamforming controller 325. However, not all of the illustrated components are essential components. The base station 320 may be embodied with more or less components than the illustrated components.

The base station 320 according to an embodiment may receive an optimal beam parameter found by the server 310 and perform signal processing according to the beam parameter in the beamforming controller 325. The transmitter 321 and the receiver 323 according to an embodiment may perform a function of transmitting/receiving a signal in an optimal direction through signal processing.

The mobile device 330 according to an embodiment may include a transmitter 331, a receiver 333, and a beamforming controller 335. However, in the mobile device 330, not all of the illustrated components are essential components. The mobile device 330 may be embodied with more or less components than the illustrated components.

The mobile device 330 according to an embodiment may receive an optimal beam parameter found by the server 310 and perform signal processing according to the beam parameter in the beamforming controller 335. The transmitter 331 and the receiver 333 according to an embodiment may perform a function of transmitting/receiving a signal in an optimal direction through signal processing.

Figure 4:
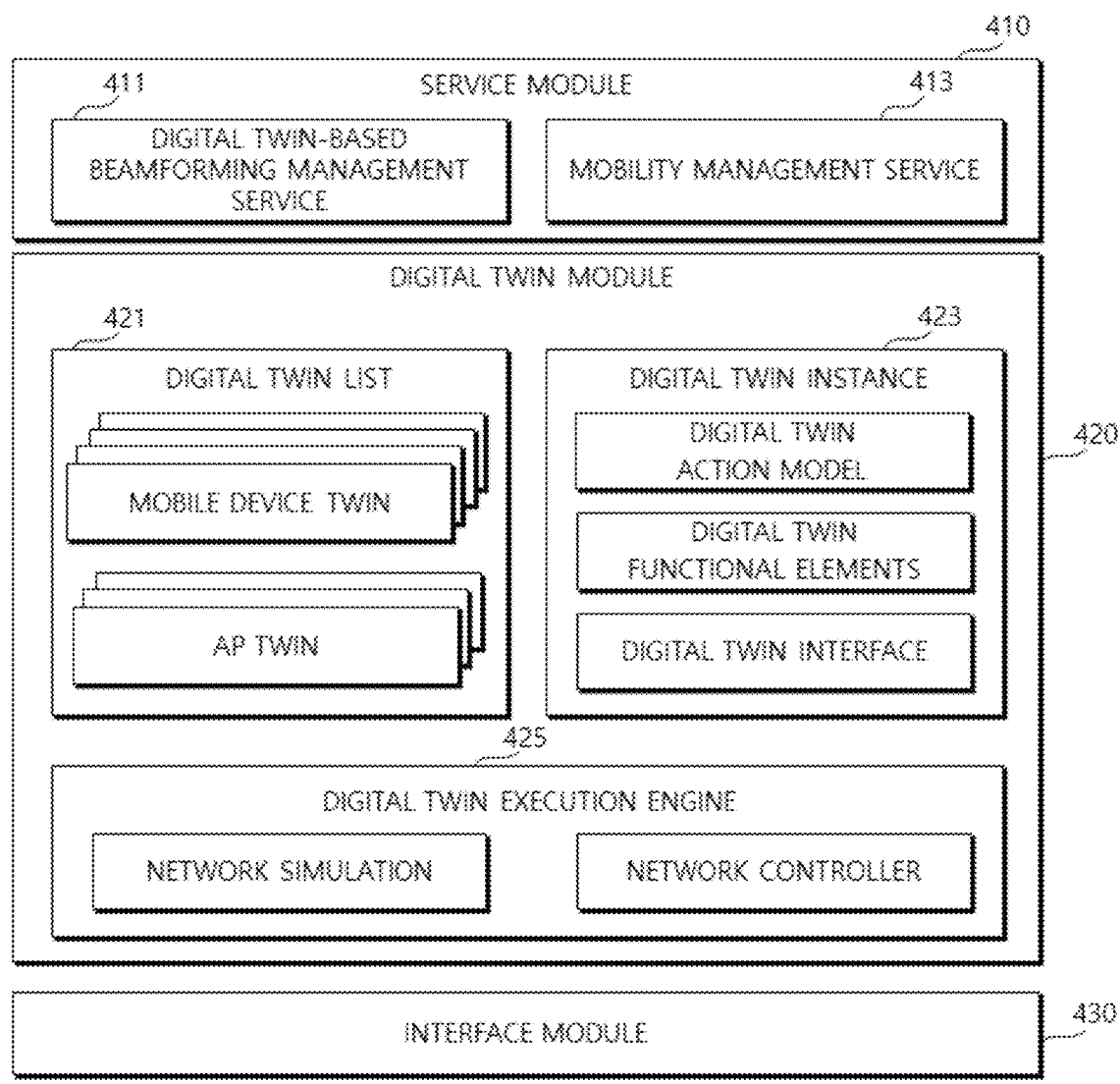
FIG. 4 is a block diagram of the server 310 operating a digital twin according to an embodiment.

FIG. 4 is a block diagram of the server 310 operating a digital twin according to an embodiment.

In the server 310 operating the digital twin shown in FIG. 4, only the components related to the present embodiment are shown. Accordingly, it is to be understood by one of ordinary skill in the art that other general-purpose components may be further included in addition to the components shown in FIG. 4. For example, the server 310 according to an embodiment may further include a digital twin function module and other service modules.

The server 310 according to an embodiment may include a service module 410, a digital twin module 420, and an interface module 430. The service module 410 according to an embodiment may include a digital twin-based beamforming management service 411 and a mobility management service 413. The digital twin module 420 according to an embodiment may include a digital twin list 421, a digital twin instance 423, and a digital twin execution engine 425. An operating method of the server 310 according to an embodiment will be described in detail with reference to FIG. 5 below.

Figure 5:
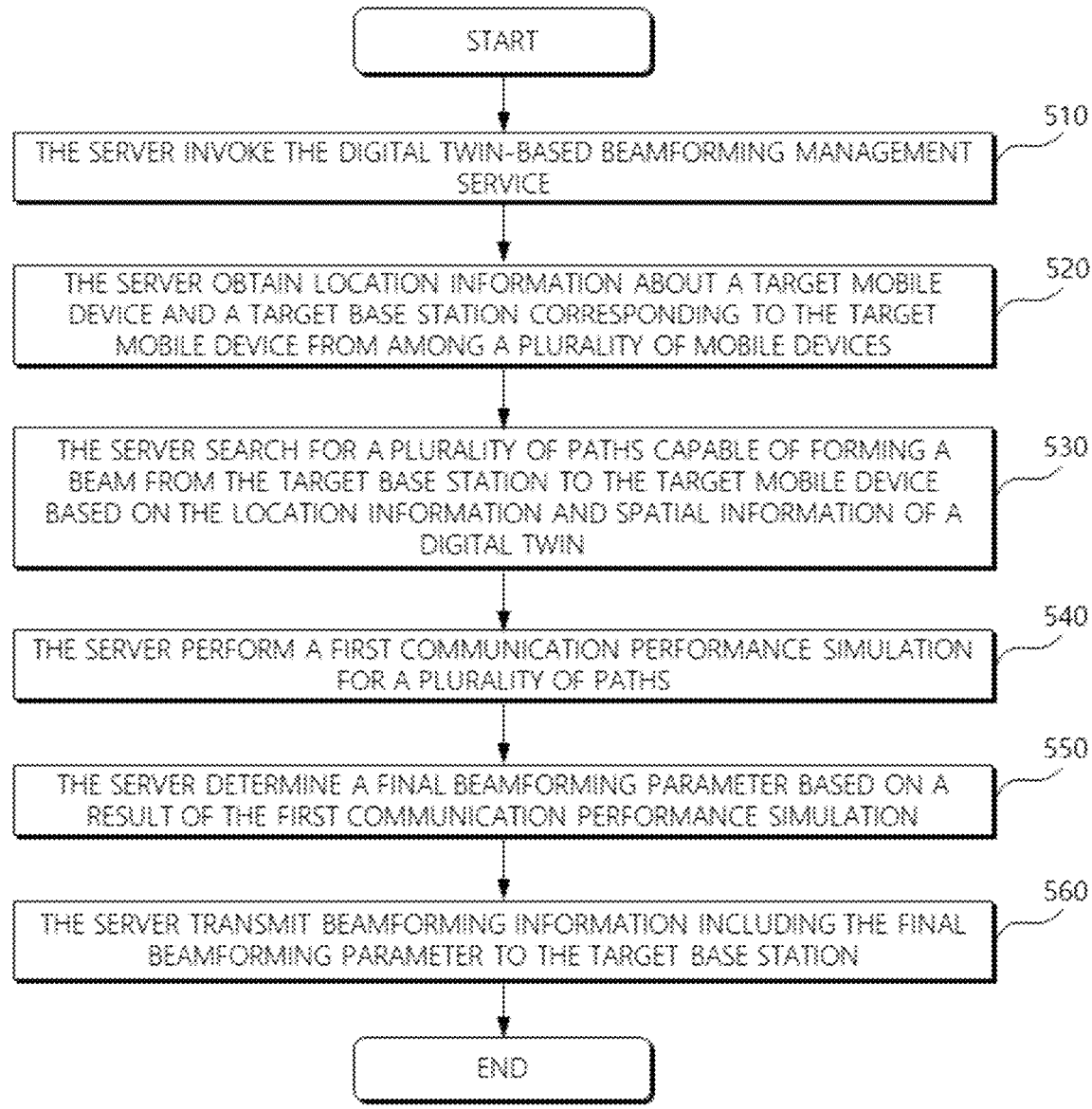
FIG. 5 is a flowchart illustrating an operating method of a server according to an embodiment.

FIG. 5 is a flowchart illustrating an operating method of a server according to an embodiment.

For convenience of explanation, operations 510 to 560 are described as being performed using the server 310 shown in FIGS. 3 to 4. However, the operations 510 to 560 may be used via any other suitable electronic device, and within any suitable system.

In addition, the operations of FIG. 5 may be performed in the illustrated order and manner, but the order of some operations may be changed or some operations may be omitted without departing from the spirit and scope of the illustrated embodiment. A number of the operations shown in FIG. 5 may be performed in parallel or concurrently.

In operation 510, the server 310 according to an embodiment may invoke the digital twin-based beamforming management service 411. The digital twin-based beamforming management service 411 according to an embodiment may perform a function of calculating a beamforming parameter according to a moving path so that communication performance is not deteriorated even when a mobile device moves.

When communication performance degradation according to an embodiment is detected, the digital twin-based beamforming management service 411 may be invoked. The communication performance degradation detection according to an embodiment may be performed through a simulation or may be received from a base station.

In relation to a communication performance degradation detection operation through a simulation according to an embodiment, the server 310 according to an embodiment may predict a moving path of a target mobile device, and may detect communication performance degradation by performing a communication performance simulation on the predicted moving path. In order to distinguish the communication performance simulation from a first communication performance simulation described below, the communication performance simulation on the predicted moving path may be referred to as a second communication performance simulation.

The mobility management service 413 according to an embodiment may monitor the location and speed of the mobile device, and may control the mobile device and a moving path of a digital twin of the mobile device. The mobility management service 413 according to an embodiment may predict at least one moving path and perform a simulation on the predicted path. For example, when destination information is known through navigation, the mobility management service 413 may predict an optimal path based on the path in a previous section.

The server 310 may build a digital twin instance 433 by activating a digital twin of a mobile device included in the digital twin list 421, and may input moving path information to the corresponding digital twin instance 433 in the mobility management service 413. The server 310 according to an embodiment may monitor communication performance according to a moving path through a network simulation of the digital twin execution engine 425.

In operation 520, the server 310 according to an embodiment may obtain location information about a target mobile device and a target base station corresponding to the target mobile device from among a plurality of mobile devices. The digital twin instance 433 according to an embodiment may obtain information from a digital twin of an operating mobile device (hereinafter, may be referred to as a target mobile device) and a digital twin of a base station (hereinafter, may be referred to as a target base station) communicating with the mobile device from among a digital twin list 431.

In operation 530, the server 310 according to an embodiment may search for a plurality of paths capable of forming a beam from the target base station to the target mobile device based on the location information and spatial information of a digital twin. In the digital twin instance 433 according to an embodiment, there are virtual assets connected to a real base station and mobile device, and the server 310 may perform beamforming, verify performance, and search for an optimal beam parameter using the virtual assets and simulation tools.

In operation 540, the server 310 according to an embodiment may perform a first communication performance simulation for a plurality of paths, and in operation 550, the server 310 according to an embodiment may determine a final beamforming parameter based on a result of the first communication performance simulation. A communication performance simulation for a plurality of paths capable of forming a beam from the target base station to the target mobile device may be referred to as the first communication performance simulation.

In more detail, the server 310 according to an embodiment may search for a path capable of forming a beam from a base station to a mobile device using a ray tracing technique, etc. based on location information of the target mobile device and the target base station and physical spatial information of a communication environment, and may perform a communication performance simulation for each path through the network simulation of the digital twin execution engine 425.

The server 310 according to an embodiment may select a propagation path showing the best communication performance because of the simulation and calculate a beam parameter for forming a beam through the corresponding path. The server 310 according to an embodiment may calculate a delay time and a phase for each element of an antenna array so that a beam is formed at an angle of departure found through a simulation.

In operation 560, the server 310 according to an embodiment may transmit beamforming information including the final beamforming parameter to the target base station. The server 310 according to an embodiment may transmit information about an optimal beam parameter and transmission time found using a digital twin to the target base station. The target base station according to an embodiment may control the antenna array using a beam parameter derived from the server 310 without performing beam training by itself.

Figure 6:
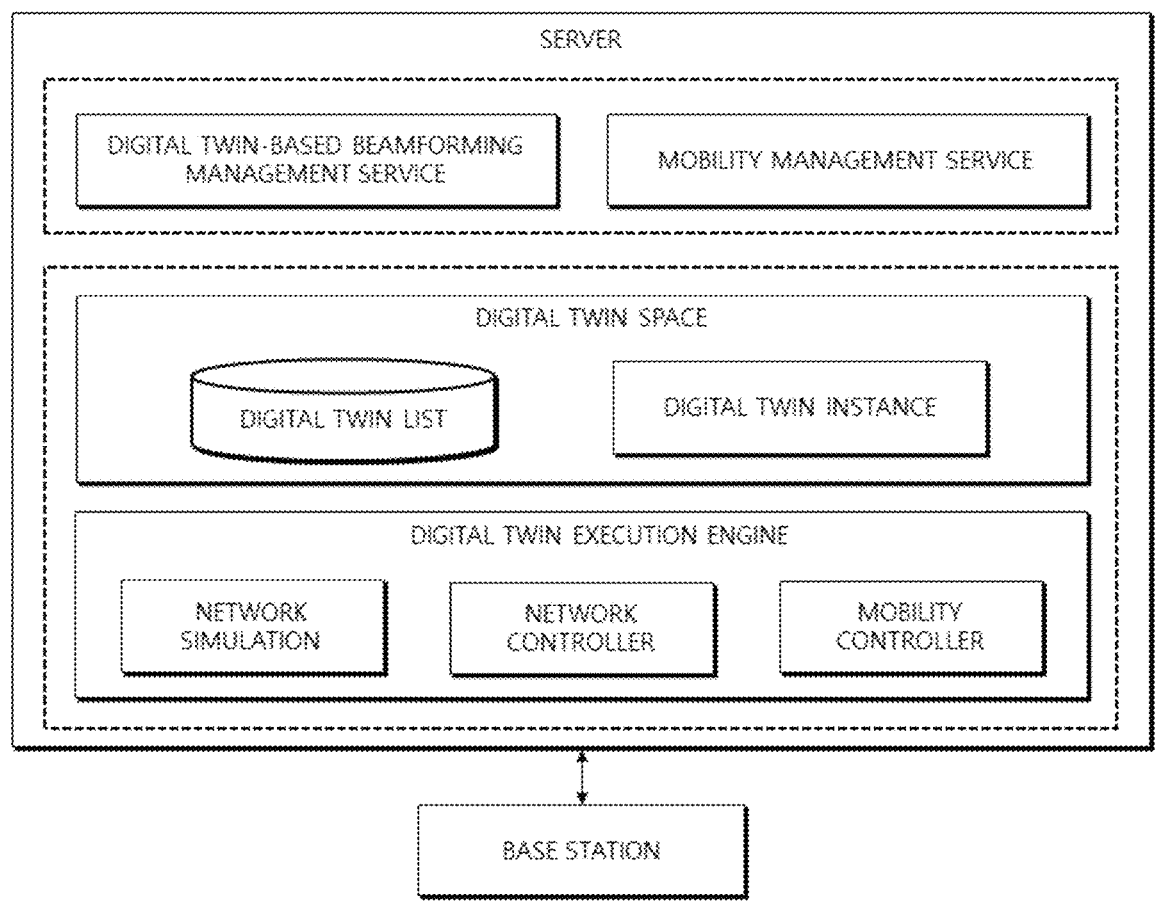
FIG. 6 is a conceptual diagram of digital twin-based training according to an embodiment.

FIG. 6 is a conceptual diagram of digital twin-based training according to an embodiment.

The contents described with reference to FIGS. 2 to 5 may be equally applied to FIG. 6, and overlapping contents may be omitted.

Referring to FIG. 6, a beamforming method according to an embodiment may not use packet exchange between the transmitter 321 and the receiver 323 and beam parameter search through channel response matrix analysis. A beam parameter may be searched using the service module 410 and the digital twin module 420 built in the server 310.

The server 310 according to an embodiment may derive an optimal beam parameter through beam forming and verification, and transmit the optimal beam parameter to the base station 320. The beamforming method according to an embodiment may omit physical packet exchange and a feedback procedure through a radio channel. In the beamforming method according to an embodiment, a data transmission rate may be improved by continuously transmitting a data payload because the radio channel is not occupied due to an NDP and a control message.

Because the beamforming method according to an embodiment does not use packet exchange in a beam training process, a training overhead may not occur. Because the beamforming method according to an embodiment has a small overhead, data transmission efficiency may be higher than that of the conventional beamforming method. A training overhead may be a problem in a large-scale mobile system, but when the beamforming method according to an embodiment is used, adaptive beamforming may be performed without overhead even in a large-scale mobile system. In the future, because the scale of a mobile system is expected to be further expanded and a lot of data traffic is expected to occur, it is expected that a technology to solve an overhead problem and efficiently perform data communication, such as the beamforming method according to an embodiment, is required.

Figure 7:
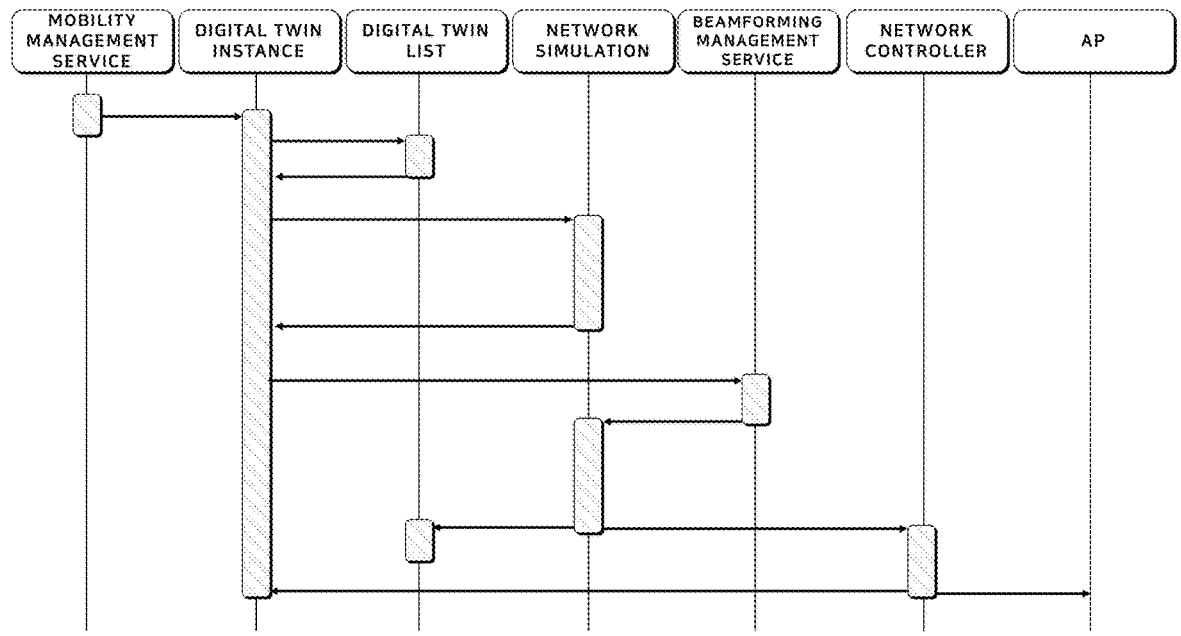
FIG. 7 is a flowchart of a packet according to an embodiment.

FIG. 7 is a flowchart of a packet according to an embodiment.

The contents described with reference to FIGS. 2 to 6 may be equally applied to FIG. 7, and overlapping contents may be omitted.

Referring to FIG. 7, a packet may be transmitted from a mobility management service according to an embodiment to a digital twin instance, and the digital twin instance may receive a response after transmitting the packet to a digital twin list.

The digital twin instance according to an embodiment may transmit a packet to a network simulation, receive a response thereto, and transmit the packet to a beamforming management service.

The network simulation according to an embodiment may receive a packet from the beamforming management service and transmit the packet to the digital twin list and network control. The network control according to an embodiment may transmit a packet to the digital twin instance and a base station.

In concluding the detailed description, those skilled in the art will appreciate that many variations and modifications may be made to the preferred embodiments without substantially departing from the principles of the present invention. Therefore, the disclosed preferred embodiments of the invention are used in a generic and descriptive sense only and not for purposes of limitation.

What is claimed is:

1. An operating method of a server operating a digital twin built into a virtual space for a plurality of base stations and a plurality of mobile devices, the operating method comprising:
    invoking a digital twin-based beamforming management service;
    obtaining location information about a target mobile device from among the plurality of mobile devices and a target base station corresponding to the target mobile device;
    searching for a plurality of paths capable of forming a beam from the target base station to the target mobile device based on the location information and spatial information of the digital twin;
    performing a first communication performance simulation for the plurality of paths;
    determining a final beamforming parameter based on a result of the first communication performance simulation; and
    transmitting beamforming information including the final beamforming parameter to the target base station.

2. The operating method of claim 1, wherein the determining of the final beamforming parameter comprises:
    determining an optimal path from among the plurality of paths based on the result of the first communication performance simulation; and
    calculating a final beamforming parameter for forming the beam with the optimal path.

3. The operating method of claim 1, wherein the determining of the final beamforming parameter comprises:
    determining an angle of departure based on the result of the first communication performance simulation; and
    calculating a delay time and a phase for each element of an antenna array for forming the beam at the angle of departure.

4. The operating method of claim 1, further comprising:
    predicting a moving path of the target mobile device;
    performing a second communication performance simulation on the predicted moving path; and
    detecting communication performance degradation of the target mobile device based on a result of the second communication performance simulation.

5. The operating method of claim 4, wherein the invoking of the digital twin-based beamforming management service comprises:
    invoking the digital twin-based beamforming management service in response to the communication performance degradation detected based on the result of the second communication performance simulation.

6. The operating method of claim 1, wherein the invoking of the digital twin-based beamforming management service comprises:
    invoking the digital twin-based beamforming management service in response to communication performance degradation information received from the target base station.

7. The operating method of claim 1, wherein the beamforming information further comprises information about a transmission time corresponding to the final beamforming parameter.

8. The operating method of claim 1, further comprising:
    controlling, by the target base station, an antenna array based on the beamforming information received from the server without performing beam training.

9. A computer program stored on a non-transitory medium for executing the method of claim 1 in combination with hardware.

* * * * *